June 20, 1950 P. K. WEIMER 2,512,123

TELEVISION RECEIVER

Filed Oct. 12, 1946

INVENTOR
PAUL K. WEIMER
BY H. S. Grover.
ATTORNEY

Patented June 20, 1950

2,512,123

UNITED STATES PATENT OFFICE 2,512,123

TELEVISION RECEIVER

Paul K. Weimer, Princeton, N. J., assignor to Radio Corporation of America, a corporation of Delaware Application October 12, 1946, Serial No. 703,050

3 Claims. (Cl. 178—5.4)

The present invention relates to television, and more particularly to television receiving systems of the projection type which are adapted for the reproduction of images in color.

In United States Patent No. 2,273,801 granted to D. O. Landis, there is disclosed a television receiver arrangement in which an image appearing on the luminescent screen of a cathode ray tube is projected by means of a spherical mirror through a correcting plate onto a translucent viewing screen lying in the focal plane of the optical system. In one embodiment, an additional mirror, having a plane surface and lying at an angle of substantially 45° to the optical axis of the system, is interposed in the optical path between the translucent screen and the correcting plate, thus permitting the screen to be positioned for optimum viewing of the image reproduced thereon.

In order to adapt a television receiver of the projection type (of which the above-mentioned Landis system is an illustration) for the reproduction of images in color, it has been proposed to modify the usual construction of the cathode ray image-reproducing tube employed therein. This modification might consist, for example, in replacing the standard phosphorescent screen normally producing white light from the tube with a screen composed of phosphors laid down side-by-side in the form of narrow strips and capable of emitting light in different selected primary or component colors of an additive color system when the phosphors are impacted by an electron scanning beam. For a so-called two-color system, alternate strips, corresponding to line traversals of the cathode ray beam, would be arranged to luminesce in bluish-green and yellowish-orange. For a tricolor system, the strips would preferably be arranged adjacent to one another in a predetermined pattern, the several strips being of such luminescent compounds as to become luminescent in red, blue or green light under electron beam impact. Examples of compounds of this type are set forth, for instance, by Leverenz in United States Patent No. 2,310,863, granted February 9, 1943.

In a tri-color system, such as the above, the received television signals comprise three groups representative of the proper component-color values of the image being televised, and these groups of signals are employed to modulate successively the electron scanning beam of the image-reproducing cathode ray tube.

If these strips of luminescent material are made sufficiently narrow, a resultant color corresponding to the integrated values of the selected component or primary blue, red and green colors of the elemental area of the image being televised will be perceived by an observer. It will be appreciated that the colored phosphor strips in such an arrangement must be very narrow in order to provide a system having adequate image resolution and definition. For example, in a tri-color television system having 400-line definition, 1200 colored phosphor strps are required. If the height of the luminescent screen is limited to 4¾" for a projection-type cathode ray tube, then each phosphorescent strip will have a width in the order of .1 millimeter.

An alternative arrangement to the above consists in employing an all-white phosphor screen, and then mounting color filter strips in proper order on, or close to, the phosphorescent screen material. This proximity of the color filter strips to the phosphor is essential in order to accommodate a wide viewing angle, and, hence, the color filter strips must be located within the tube envelope. However, it has been found that the evacuation process utilized in the manufacture of cathode ray tubes renders the use of ordinary color filters impractical, and that specially prepared filter elements are necessary.

The present invention provides means whereby color filter strips, as employed in a color television system of the projection type, may be made of considerably larger dimensions than formerly permissible. This simplifies the problem of mounting the individual filter strips relative to one another, and also allows the utilization of commercially available filters. Moreover, since a feature of the present invention resides in the fact that the color filter strips are external to, and physically separated from, the image-reproducing tube, the latter may be of any suitable design having a conventional uni-colored screen. This is of importance as regards servicing costs when replacement of the cathode ray tube is necessary. In addition, the color filter strip assembly of the present invention is located in that portion of the receiver housing remote from the remainder of the television receiving apparatus, and hence is relatively free from the possibility of damage resulting from electrical or mechanical failure of some portion of the receiving apparatus.

One object of the present invention, therefore, is to provide an improved television receiving system of the projection type which is particularly adapted for the reproduction of images in color.

Another object of the present invention is to provide a color television receiver of the projection type in which a color filter element assembly is mounted adjacent to, and substantially coplanar with, the translucent viewing screen.

Other objects and advantages will be apparent from the following description of a preferred form of the invention and from the drawing, in which.

Figure 1:
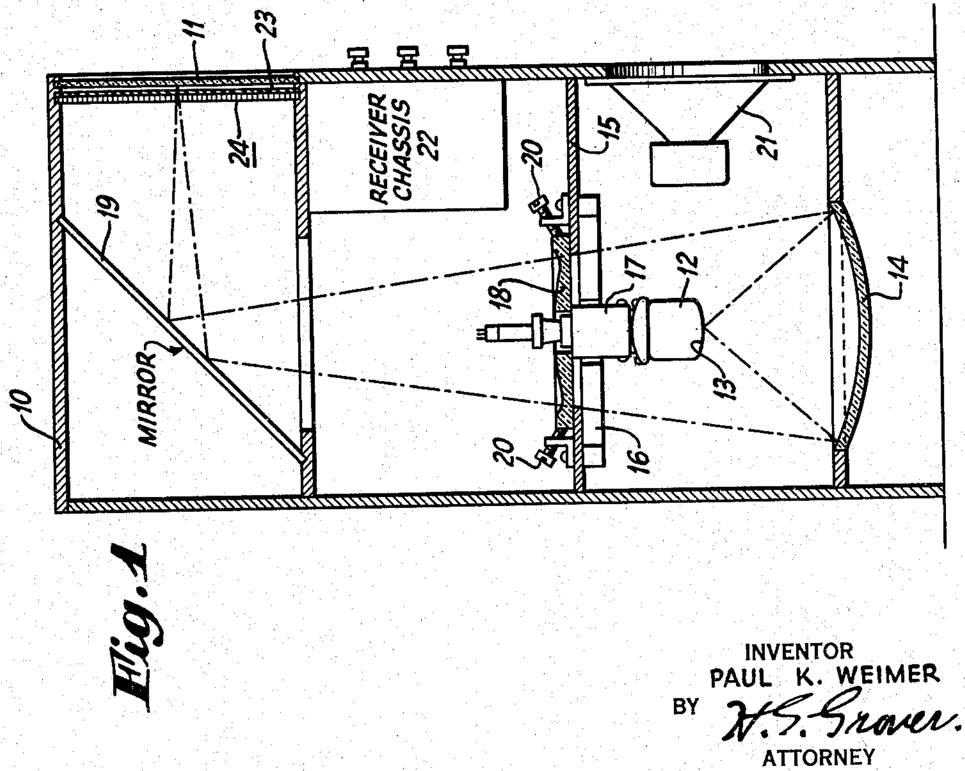
Fig. 1 is a partly sectional view of a projection-type color television receiver in accordance with the present invention.

Referring now to the drawing and to Fig. 1 in particular, there is shown a television receiver of the console type including a cabinet or housing indicated by the reference numeral 10. The cabinet 10 is provided in the upper portion thereof with a translucent screen 11, composed of material such, for example, as plastic or ground glass, and upon which the televised image is reproduced for viewing by observers.

A cathode ray tube 12 of the projection type is positioned in the lower portion of the cabinet 10 in such a manner that the fluorescent screen 13 of the tube faces a spherical mirror 14. Tube 12 is supported from a partition or shelf 15 by means including a mounting member 16. A deflecting yoke 17, which may be of any suitable construction, is provided for the purpose of deflecting the electron scanning beam developed within tube 12 in mutually perpendicular directions to trace the image raster in tube 12.

Also supported by the partition or shelf 15 is a correcting plate 18, this correcting lens or plate 18 being located at or close to the center of curvature of the spherical mirror 14, and serving to direct the light rays originating at the fluorescent screen 13 of tube 12 and reflected from the spherical mirror 14 toward the translucent screen 11, all as explained in the mentioned Landis patent. A plane mirror 19 is mounted in the upper portion of the cabinet 10, as illustrated, and lies at an angle of approximately 45° to the optical axis of the assembly consisting of tube 12, spherical mirror 14, and correcting plate 18. A plurality of screws 20 are provided to facilitate positioning and adjustment of the correcting plate 18.

A sound loud-speaker 21 and the television receiver chassis 22 may be located within the receiver cabinet 10 in the positions illustrated for reproducing the audio portions of received signal components.

Figure 2:
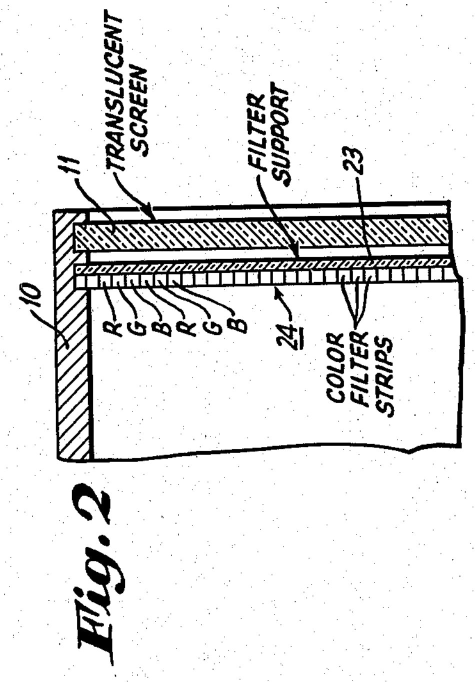
Fig. 2 is a detailed view of a portion of Fig. 1.

A filter support 23, preferably comprising a thin sheet of some suitable transparent material such as clear glass or plastic (such as methyl-methacrylate), lies in back of, and substantially coplanar with, the translucent screen 11. As best shown in Fig. 2, this filter support 23 is mounted in close proximity to the inner surface of the translucent image viewing screen 11.

Figure 3:
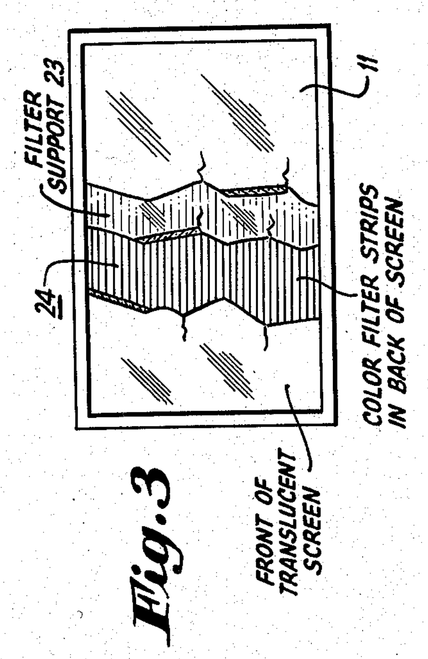
Fig. 3 is a front view of the translucent screen illustrated in Figs. 1 and 2, with part of the screen broken away to show the location of the color filter strips.

A plurality of colored filter strips, generally indicated in the drawing by the reference numeral 24, are securely affixed to the rear surface of the filter support 23, preferably by means of some suitable adhesive medium. These filter strips 24 are composed of materials which respectively transmit (for a tri-color television system) only the primary colors red, green and blue, and their mounting position is chosen to correspond to the line-scanning traversals across the translucent screen 11 of the light spot reflected from the fluorescent screen 13 of tube 12 by means of the mirrors 14 and 19. Hence, when the line-scanning operation is in the usual horizontal direction (with reference to screen 11), the strips 24 are mounted horizontally, as best shown in Fig. 3. When the line-scanning operation is in a vertical direction, however, the strips 24 are mounted vertically. Furthermore, the red, green and blue colored filter strips 24 are arranged in an alternate manner, as indicated in Fig. 2 by the letters R, G and B.

The correcting lens or plate 18 is so designed as to bring the light rays originating at the fluorescent screen 13 to a focus on the rear surface of the translucent screen 11, as indicated by the broken-line light paths in Fig. 1. Since the color filter strip assembly 24 is located very close to the rear surface of screen 11, however, the scanning light spot is also substantially in focus on the rear surface of the filter assembly 24.

The relative size of the color filter strips 24 has been greatly exaggerated in the drawing in the interest of clarity of illustration. Actually, a single series or unit of the filter strips 24 (or, in other words, a single red strip, a single green strip, and a single blue strip) are of such width that together they are equal to the diameter of the normal scanning light spot which traverses the screen 11 during the reconstitution of black and white television images. Accordingly, in the present invention, the diameter of the scanning light spot on screen 11 is reduced to one-third of that for corresponding black and white television reception. As a result, a color image is reproduced having a fineness of detail equal to that of a corresponding black and white image. Of course, the strips 24 may, if desired, each be of the diameter of the normal scanning light spot in black and white television, and the scanning spot size may be the same as for black and white television. However, in this case, the color structure of the reproduced image will be more conspicuous.

The filter strips 24 may comprise colored glass filaments, or plates, or they may be any other elements serving the purpose of color filters such, for example, as differently colored gelatins within a transparent hermetically sealed coating. It should be emphasized, however, that the particular composition of the color filter strips 24 forms no specific part of the present invention. Furthermore, it is within the scope of applicant's disclosure to replace the strips 24 with an array of colored dots forming various geometric patterns. In such an event, however, it is necessary that the arrangement of the colored dots bear a definite relationship to the line-scanning operation of the cathode ray tube 12.

The operation of the disclosed system may be similar to that of the known system hereinbefore mentioned in which color filter strips are enclosed within the envelope of the cathode ray tube. Therefore, the operation of the present invention will not be described in detail, and it is deemed sufficient to mention that, as previously stated, the received television signals may comprise three groups, the first group being generated by light from the object being televised passing through a red filter, the second group being generated by light from the object being televised passing through a green filter, and a third group of signals being generated by light from the object being televised passing through a blue filter. With proper synchronization between the transmitter and receiver, the electron scanning beam developed within tube 12 will cause a spot of light to traverse each one of the red filter strips 24 during the period that the group of signals corresponding to the red color component of the object being televised is being received, and, in a similar manner, each one of the green and blue filter strips 24 during the reception times of the groups of signals corresponding to the green and blue color components, respectively, of the object being televised. Due to the persistency of vision, an observer will see a resultant color corresponding to the integrated values of these color components, and the actual color of each particular elemental area of the object being televised will be accurately reproduced on the viewing screen 11.

It is within the scope of the present invention to utilize a type of cathode ray tube 12 having a particular electrode structure, such, for example, as that set forth in my copending United States Patent application Serial No. 5,431 filed January 30, 1948, and entitled "Television Receiving Systems." It is then necessary that such electrode structure be in registry with the color filter strips 24. This is merely a question of alignment if there is no geometric distortion in the optical light path between the tube 12 and the screen 11. If such geometric distortion exists, however, it may be compensated for by slightly curving the filter strips 24 so that they will conform to the shadow pattern projected on the screen 11 by the particular electrode structure of the cathode ray tube.

It is also within the scope of the present invention to employ a system of scanning such as set forth in my copending application Serial No. 5,431, above mentioned. In this system, the electron scanning beam moves transverse, or perpendicular to the filter strips 24. For line scanning in a horizontal direction, therefore, the color filter strips 24 are vertically mounted. The video signal which is applied to the control electrode of the image reproducing device 12 is switched from that representative of one color to that representative of another color at a rate in synchronism with the speed at which the electron scanning beam crosses the adjoining color filter strips. In other words, when the electron scanning beam is crossing the green color filter strip, for example, the video signal applied to the control electrode of the image reproducing device is representative of the green color component of the object being televised. As the beam crosses the blue strip, the video signal is switched to that representative of blue, etc. The resultant image appearing on the translucent screen 11 is similar to that described above.

Inasmuch as the present disclosure provides for a rigidly-positioned color filter element assembly in television receivers of the projection type, it is clear that the particular arrangement of the image-projection apparatus forms no specific part of applicant's invention. For example, the image produced on the luminescent screen of the cathode-ray tube 12 may be projected toward the color filter element assembly of the present invention through one or more lenses having any suitable focal length. In this case, all or part of the spherical mirror 14, correcting plate 18, and plane mirror 19 of Fig. 1 may be omitted, as well as their associated elements.

It is further within the scope of the present invention to eliminate the viewing screen 11 of Figs. 1, 2 and 3. The outer surface of the filter support 23 may then be roughened so that the projected image will be caused to appear thereon. As an alternative, the filter support 23 itself may be made of translucent material. Still further, if no support for the color filter elements 24 is required, the member 23 may be entirely omitted and one surface of the color filter elements 24 roughened to act directly as a viewing medium.

If desired, various systems of interlaced scanning (such as double or triple interlace) may be employed in connection with the present disclosure without departing from the spirit of the invention.

I claim:

1. In a television image projection device adapted for the reproduction of images in color, the combination of a cathode ray tube having a luminescent target area upon which an optical image is produced through the line-by-line scanning action of the electron beam developed within said tube, a spherical reflector having its concave surface area positioned to receive the light of the image as produced on the tube target area, an aspherical zone plate located external to the tube-to-reflector light path, a translucent projection screen positioned in the focal plane of said aspherical zone plate, said zone plate being arranged to receive light from the reflector and to provide a sharply focused enlarged image of the tube target area on the said projection screen, and a color filter assembly including a relatively thin sheet of transparent material mounted in closely spaced-apart co-planar relation with that surface of said projection screen facing said aspherical zone plate, and a plurality of color filter strips supported and positioned by said transparent sheet, said color filter strips being arranged in registry with the line-scanning traversals across said projection screen of the image-producing light spot reflected from the luminescent target area of said cathode ray tube by said spherical reflector.

2. A television image projection device according to claim 1, in which the color filter strips included in said filter assembly are composed of materials which respectively transmit only the primary colors red, green and blue.

3. A television image projection device according to claim 1, in which the width of each color filter strip included in the said filter assembly is substantially equal to the diameter of the image-producing light spot traversing said projection screen.

PAUL K. WEIMER.

REFERENCES CITED

The following references are of record in the file of this patent:

UNITED STATES PATENTS

| Number | Name | Date |
|---|---|---|
| 2,273,801 | Landis | Feb. 17, 1942 |
| 2,287,307 | Herbst | June 23, 1942 |
| 2,296,908 | Crosby | Sept. 29, 1942 |
| 2,310,863 | Leverenz | Feb. 9, 1943 |
| 2,415,059 | Zworykin | Jan. 28, 1947 |